March 4, 1958 H. G. JOHNSON 2,825,142

IMAGE REGISTERING APPARATUS FOR PHOTO-COMPOSING MACHINES

Filed June 29, 1956

3 Sheets-Sheet 1

INVENTOR.
Henry G. Johnson

BY
William D. Hager
ATTORNEY.

March 4, 1958 H. G. JOHNSON 2,825,142

IMAGE REGISTERING APPARATUS FOR PHOTO-COMPOSING MACHINES

Filed June 29, 1956 3 Sheets-Sheet 2

INVENTOR.
Henry G. Johnson
BY
William D. Hager
ATTORNEY.

March 4, 1958 H. G. JOHNSON 2,825,142

IMAGE REGISTERING APPARATUS FOR PHOTO-COMPOSING MACHINES

Filed June 29, 1956 3 Sheets-Sheet 3

INVENTOR.
Henry G. Johnson
BY
William D. Hager
ATTORNEY.

1

2,825,142

IMAGE REGISTERING APPARATUS FOR PHOTOCOMPOSING MACHINES

Henry G. Johnson, Berkeley, Calif.

Application June 29, 1956, Serial No. 594,913

20 Claims. (Cl. 33—184.5)

This invention relates to photo-composing devices and more particularly to apparatus for orienting halftone negatives relative to their holders or chases so as to insure precise image registration.

In the production of color prints by lithographic methods, a series of printing plates are prepared; one plate being provided for each color. These plates are inked with the appropriate color and brought into contact with the paper in one at a time order so that the color images are superimposed. In order to present the desired effect to the eye, the images must be in precise registration, otherwise an unsightly overlapping of the different colors will be distracting to the eye.

Color reproduction of photographs by the well-known halftone screen method makes the elimination of unsightly effects more difficult because of the increased precision of registration required. In the halftone color process, a negative is prepared for each color and each of the negatives is provided with identical index marks, usually four cross marks adjacent to the borders of the negative. These marks are used to effect the necessary precise registration of the images transferred from the negatives onto the individual color printing plates.

When only single images are to be printed, the presently available types of equipment permit some rotation or cocking of the printing plate on the press bed or cylinder. This permits some latitude in orienting the images relative to the printing plates. But, often it is desired to print a series of identical images from the same printing plate. To prepare such a plate, a process known as "step and repeat" photo-composing is employed. In this process the same negative is sequentially exposed in a series of locations onto the sensitized plate forming a line or grid pattern of identical images. The separate color plates are prepared in this manner and are then sequentially printed in the usual superimposed manner on the paper. Additional difficulties are invariably encountered in the step and repeat method in obtaining precise registration of the images. If one of the color negatives is cocked slightly relative to the direction of the line of step and repeat, a line of images will be formed in which each of the images is slightly cocked. During the press run, if the printing plate is rotated to obtain precise registry of the first images in the line, it will be obvious that the line of cocked images will diverge from the lines which are not cocked. To overcome this problem, the existing photo-composing machines mount the negatives in a holder or chase which is mounted on the machine in a fixed relationship to the direction of travel of the holder relative to the printing plate. If each of the negatives is then oriented precisely with respect to its holder, they will each be aligned so that cocking is impossible.

The existing machines detachably mount the negative holder on the photo-composing machine, and utilize a separate register device in which the negative holder fits. The register device has suitable indicia, such as fine perpendicular lines with which the index marks on the negatives may be coincided. The provision of separate register devices, which are often located some distance from the photo-composer, presents many problems in maintaining the orientation of the negatives. For example, the usual negative holders mount the negative on a glass plate which is rotated or cocked relative to the holder frame by thumbscrews. In removing the holder from the register device and carrying it to the photo-composing machine, the adjustment of the thumbscrews may be easily disturbed destroying the orientation of the negative. Also it is easy to drop and damage the holders. Furthermore, the necessary steps of detaching the holders from the photo-composer, carrying them over to the register device, mounting them thereon, and returning and mounting them on the photo-composer, takes valuable time and multiplies the possibility of error in positioning the holders in the jig fixtures on the photo-composer and register device.

The present invention contemplates a photo-composer having a register device movable into a predetermined relation to the negative holder, for precise orienting of the negatives, in which it is not necessary to remove the holder from its place on the photo-composer. The register device is mounted on the photo-composing machine, on the portion which supports the negative holders, and is movable into the predetermined orienting relation with the holders, which can be left in the desired predetermined relation to the movement of the printing plates. Such construction permits the use of a plurality of negative holders and associated sensitized printing plates on the same machine for composing the plates for all of the required colors simultaneously. The register device is slidably mounted on the supporting structure in such manner that it maintains the same orientation in all positions, thus making it impossible to have any image cocked relative to the other images so long as the index marks on the negatives are registered with the indices on the register device. Also incorporated in the unitary construction of the present invention, is means for obtaining a perfect predetermined and uniform alignment of the register device to the negative holders, and of the printing plates relative to both the register device and holders, so as to insure exact positioning on the printing plates of precisely oriented images. Such uniform alignment affords a resultant perfection of printed image heretofore found to be rarely obtainable with existing devices.

Accordingly, it is an object of the present invention to provide an image registering apparatus for photo-composing machines which will provide for rapid and precise orienting of halftone negatives, for precise registration of their printed images, without the necessity for removing the negative holders from the machine.

Another object of the present invention is the provision of an apparatus of the character described which may be employed to effect precise orientation of uni-color negatives in a step and repeat photo-composing machine.

A further object of the present invention is to provide an apparatus of the character described which is effective to orient negatives precisely in multiple holders for simultaneous printing of the images corresponding to different colors on separate printing plates.

A still further object of the present invention is to provide, in a device of the character set forth, for simple and rapid alignment of the printing plates with a single register device so that the step and repeat images will have the same relative position and orientation on each plate.

Yet another object of the present invention is to provide an image registering apparatus for photo-composing machines in which the negative holders and printing plates are relatively movable toward and away from each other whereby the holders may be selectively moved into juxtaposition with the sensitized printing plates for imprinting the image thereon or into spaced relation from the printing plates during the aligning procedure.

Other objects and features of advantage of this invention will become apparent from the drawings and the following description, and it is not intended to limit the invention except to the extent set forth in the appended claims.

With reference to said drawings.

Figures 1, 2, 3:
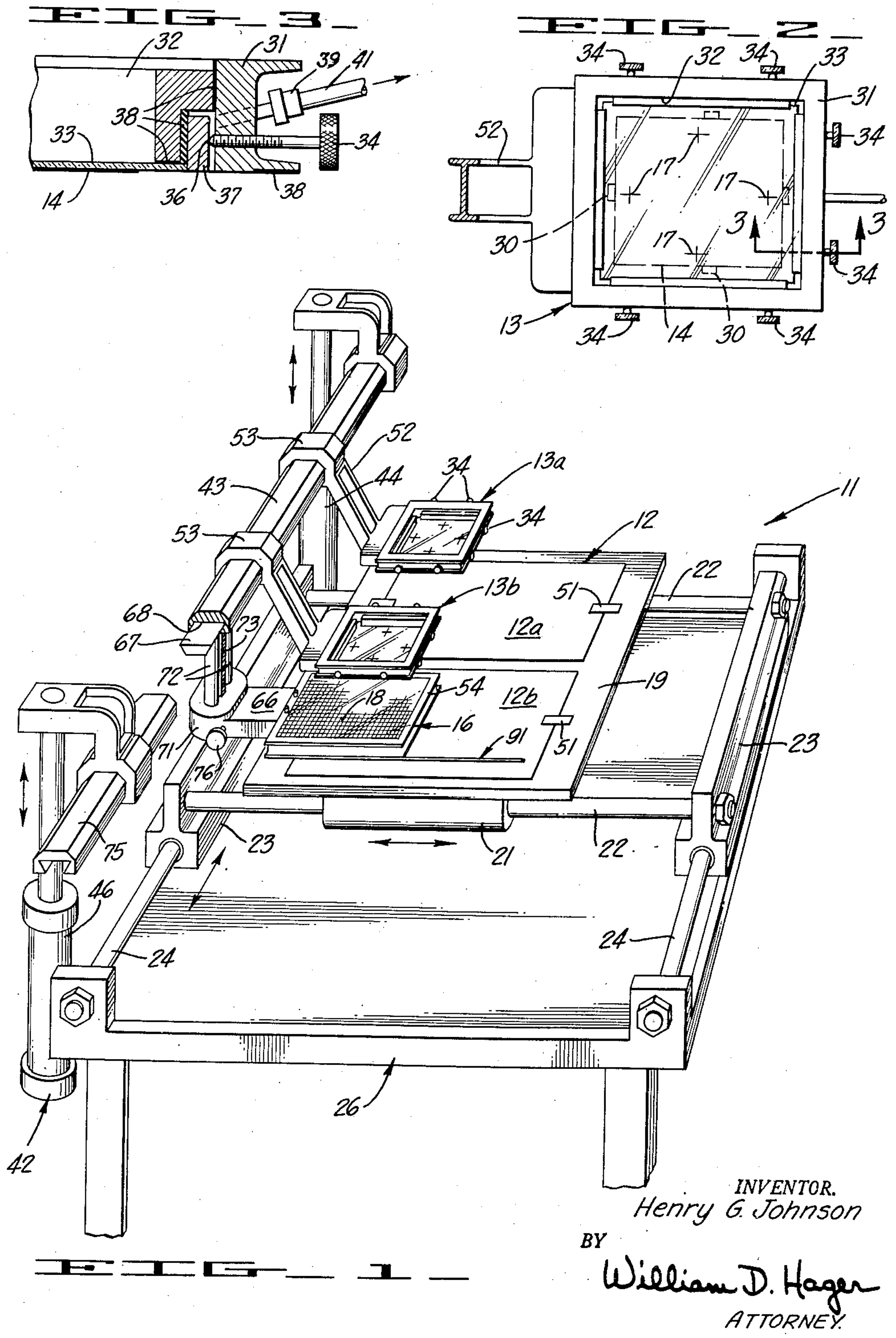
Figure 1 is a perspective view of an image registering apparatus for photo-composing machines constructed in accordance with the present invention.
Figure 2 is a plan view on an enlarged scale of a typical negative carrier as used in the present apparatus.
Figure 3 is a fragmentary cross-sectional view, on an enlarged scale, of the negative holder and is taken substantially on the plane of line 3—3 of Figure 2.

The image registering apparatus for photo-composing machines of the present invention, and as illustrated in the accompanying drawings, includes: a table means 11 adapted to receive and support a sensitized printing plate 12; a negative holder 13 formed to receive and support a halftone negative 14; means for moving the negative folder 13 between a first station, in juxtaposition to the table means and with the negative 14 in contact with the sensitized plate 12 for printing of an image thereon, and a second station (as illustrated in Figure 1) spaced from the table means; and register means 16 movable into a predetermined relation to the negative holder 13 when the latter is at its second station, the register means being adapted for aligning the index marks 17 on the halftone negative 14 whereby successive negatives may be precisely oriented relative to the table means 11, the register means also being formed to provide indicia 18 for orienting the sensitized plates relative to the table means 11.

The image registering apparatus is particularly adapted for use with a photo-composing machine in which the negative holders and printing plates are relatively movable in mutually perpendicular directions, whereby the negatives may be used to print a series of identical images on the same plate in the well-known "step and repeat" process. This relative movement of negative holder and printing plate may be accomplished in a variety of ways. The table means upon which the printing plates are supported may be fixed and the negative holder movable, the table means and negative holder may move in perpendicular paths, or the negative holders may be fixed and the tables means move. The latter construction is preferred and is illustrated in Figure 1. Basically, as here shown, the table means 11 includes a table member 19 mounted on a carriage 21 which is slidably supported for side to side motion on rods 22. A second carriage 23 supports the rods 22 and is itself slidable in a forward and backward direction on rods 24 mounted on a fixed stand 26. The table 19 is free, therefore, to move in its own plane in mutually perpendicular directions without any rotation or cocking of the table. During the aforementioned step and repeat photo-composing, a light source (not shown) is mounted over the holder 13 so that the light passes its rays through the negative to form an image on the sensitized plate 12. The plate is then moved a desired increment and is exposed again to build up a string of identical images. The means for determining the desired increments of motion of the table are well known to the art and form no part of the present invention, it being sufficient for present purposes to note that the increments may be determined either by calibrating, measuring, or by providing fixed or adjustable stops on the table 19 and stand 26.

The negative holders 13 are designed to receive and support the negatives 14 to be printed in a position suitable for both the printing and aligning operations. As may best be seen in Figures 2 and 3, the holders 13 include a rectangular frame 31, of some rigid and lightweight material such as aluminum. The frame 31 is formed with a cut out portion providing a rectangular opening 32 in which is carried a transparent plate 33, of glass or the like. The negative 14 is affixed as with masking tape 30 to the underside of the plate 33, or if the negative is on a glass plate already, such plate may be used. Orientation of the negative 14 relative to the holder frame 31 is accomplished by means of thumbscrews 34 screwed into the frame with their inner ends 36 bearing against metal members 37 which, in turn, bear against the edges of the plate 33. The thumbscrews are located at the corners of the plate 33 and the arrangement is such that suitable turning of the thumbscrews will effect a rotative displacement of the plate and negative carried thereon. In this manner, the negative may be oriented or cocked relative to the frame 31 with utmost precision, and thereafter retained in the oriented position. Rubber seals 38 are provided on the negative holder so that, when the negative 14 is brought into contact with the printing plate 12, the space between the printing plate and the transparent plate 33 may be evacuated through fitting 39 and hose 41. This evacuation is standard procedure and insures the closest possible contact between the negative and printing plate during the imprinting of the image on the printing plate.

As an important feature of the present invention, means 42 is provided for moving the negative holder 13 between a first station in juxtaposition to the table means 11, where the negative 14 is in printing contact with the sensitized plate 12, and a second station spaced from the table means. Preferably, and as here shown, the negative holder 13 is supported on a carrier member 43 which is positioned adjacent the table means. The carrier member 43 is supported on reciprocating means, here afforded by hydraulic cylinders 44 and 46, arranged to move the carrier member toward or away from the plane of the table means 11. By suitable operation of the cylinders 44 and 46, the carrier member 43 and holders supported thereon may be selectively moved between the aforesaid stations as desired.

The apparatus of the present invention is particularly adapted for simultaneous photo-composing, that is, for imprinting properly relatively oriented images on more than one printing plate at the same time. This method is especially suited for step and repeat printing of different color plates simultaneously so as to reduce the number of step and repeat operations and hence reduce the possibility of error. To accomplish simultaneous photo-composing, several sensitized printing plates 12, one for each color, are mounted on the table 19 by means of masking tape 51 or the like. One negative holder 13 for each color is provided and these are proportioned so that the negative holder for a particular color is positioned in overlying relation to the corresponding printing plate. A two color set-up is illustrated in Figure 1 of the drawings wherein printing plates **12*a* and 12*b* are mounted in side by side relation on the table 19, and a pair of holders 13*a* and 13*b* are supported in overlying relation to the plates. Since different size plates may be used, the holders 13*a* and 13*b* are here mounted on brackets 52 which have head portions 53 slidably mounted on the elongated carrier member 43 to permit adjustment of the spacing between and the location of the holders to correspond to the spacing and location of the printing plates 12***a* and 12*b*.

Figure 4:
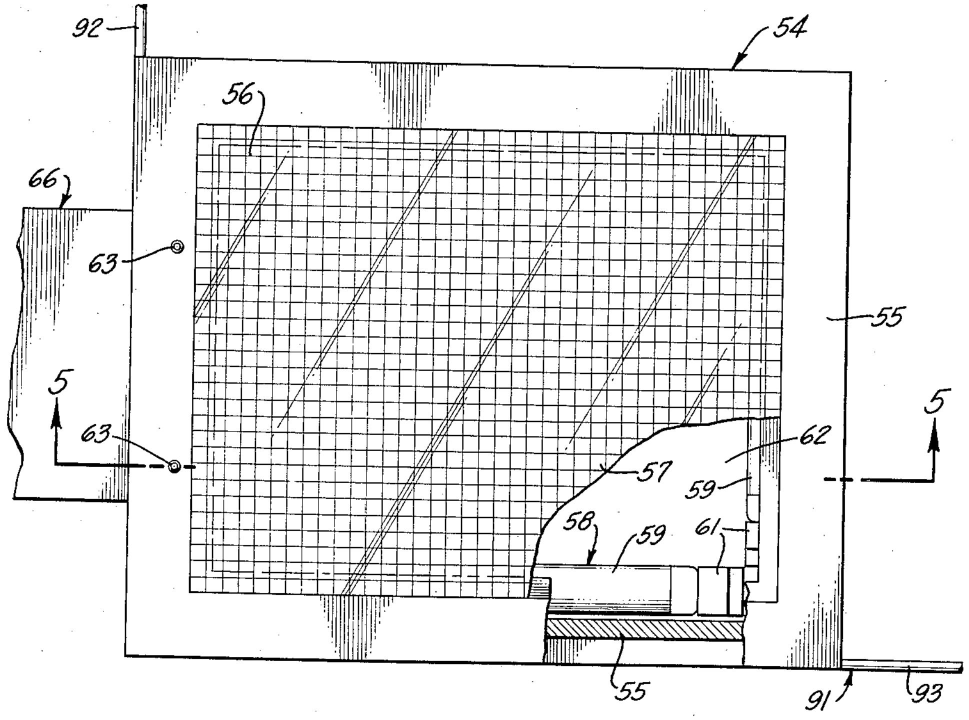
Figure 4 is a plan view on an enlarged scale of a register device constructed in accordance with the present invention, and having portions broken away and shown in section for clarity of illustration.
Figure 5:
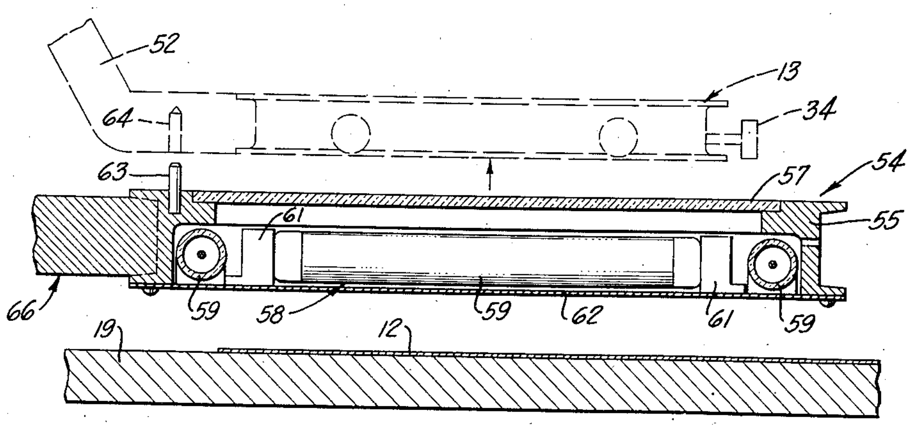
Figure 5 is a longitudinal sectional view of the register device taken substantially on the plane of line 5—5 of Figure 4.

In accordance with the present invention, the register means 16 is movable into a predetermined relation to the negative holders 13*a* and 13*b* when the latter are at their second station, spaced from the table 19. Preferably, the register means 16 includes a register device 54 adapted for aligning the index marks 17 on the negatives 14 so as to orient the negatives in the manner described. Such aligning may be accomplished by any suitable means, either visual, mechanical or electrical, but for present purposes a visual system is preferred. Accordingly, the register device 54 is provided with line indicia 56 with which the cross-marks 17 may be registered by visual inspection. As may best be seen in Figures 4 and 5, the register device 54 includes a light-weight but rigid frame 55 of aluminum or the like upon which is mounted a transparent plate 57, provided with the indicia 56, and a light source 58 adapted to pass light through the plate 57 for illuminating the indicia. In the form illustrated in Figures 4 and 5 of the drawings, the register device 54 is of substantially flattened rectangular shape and the light source 58 consists of tubular light bulbs 59 carried in suitable sockets 61. Preferably, the bottom of the register device is blocked off by a sheet metal member 62 so as to prevent light leakage from the register device onto the sensitized plates 12. The indicia 58 may be of any suitable form which will cooperate with the index marks 17 and are here shown as two sets of fine parallel lines scribed on the plate 57 in perpendicular relation to each other to form a grid arrangement. It is sometimes desirable to locate each negative in the same relative position to its holder. To accomplish this, a pair of locating pins 63 are affixed to the register frame 55 and project upwardly therefrom for engagement in locating holes 64 formed in the negative holder brackets 52.

The various portions of the apparatus are formed and proportioned so that, when the negative holders 13 are at their second station spaced from the table 19, the register device 54 may pass between the holders and the printing plates 12 on the table so as not to scratch either the negatives 14 or the printing plates. As shown, the register device is mounted on an assembly 66 which includes a tongue member 67 slidably mounted in a mating groove 68 formed along the underside of the carrier member 43. The assembly 66 depends from the carrier member so as to pass under the holder bracket heads 53. In order to bring the register plate 57 up into close proximity with the negatives 14, for precise aligning of index marks with indicia, the assembly 66 provides means for selectively raising and lowering the register device. Preferably, the assembly 66 includes a bracket portion 71 affixed to the register device 54 and slidably journaled on vertical rods 72 secured to the tongue member 67. Vertical adjustment is obtained by a rack and pinion carried in the bracket 71 with the rack 73 mounted parallel to and between the rods 72, and the pinion on the shaft of a handwheel 76. In this manner, rotation of the handwheel 76 permits selective positioning of the register device 54 as desired. After use in orienting the negatives 14, the register device is slid out of the way along the carrier member 43 thus making it unnecessary to remove the register means from the apparatus during photo-composing printing. Accordingly, the carrier member 43 has a suitable extension 75 on which the register means may be positioned when not in use.

Figure 6:
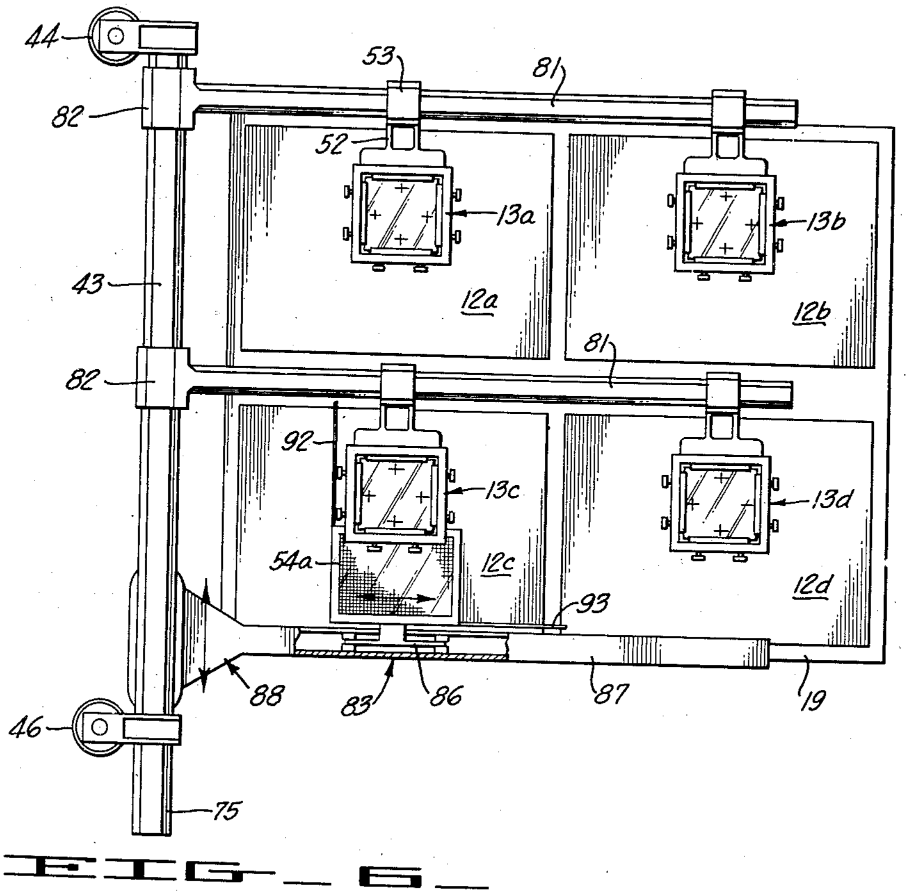
Figure 6 is a plan view of a modified form of the image registering apparatus for photo-composing machines of the present invention.
Figure 7:
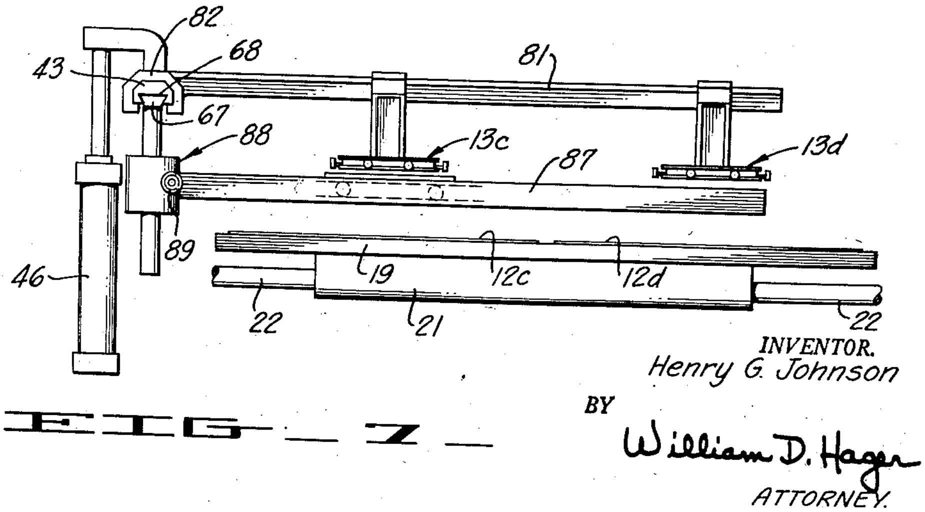
Figure 7 is a side elevational view of the apparatus of Figure 6.

A modified form of the apparatus of the present invention is illustrated in Figures 6 and 7 of the drawings in which four color printing plates 12*a*, 12*b*, 12*c*, and 12*d* are mounted in a checkerboard pattern on the table top 19. When several colors are to be simultaneously photo-composed this type of checkerboard arrangement is necessary to avoid having an excessively long table means 11. In this form of the invention, the negative holders 13*a*, 13*b*, 13*c*, and 13*d* are positioned in overlying relation to their corresponding printing plates 12*a*—12*d* by mounting the holders for sliding movement along extension arms 81. Head portions 82, corresponding to bracket head portions 53 of Figure 1, are provided on the extension arms 81 whereby the latter, together with the negative holders carried thereon, may move parallel to the length of the carrier member 43. Thus, the negative holders 13*a*—13*d* may be individually moved into the correct position without disturbing the orientation of the holders relative to the table. The register means 83 is similar to the register means 16 of Figure 1 in operation, and the register device 54*a* may be substantially identical to the register device 54 of Figure 1. However, as will be apparent, it is necessary to provide for adjustment of the register device 54*a* with each of the negative holders 13*a*—13*d*. To accomplish this, the register device 54*a* must be movable in mutually perpendicular directions, parallel to both the carrier member 43 and extension arms 81, but must not rotate in order to assure the necessary orientation of the images. Such movement is here provided by mounting the register device 54*a* on a carriage 86 movable along the length of an arm 87 which is carried by an assembly 88, similar to assembly 66 of Figure 1, for movement along the carrier member 43. The assembly 88 maintains the arm 87 in parallel relation to the extension arms 81 at all positions and is provided with a rack and pinion assembly, controlled by handwheel 89, for moving the register device 54*a* up and down as desired.

While, as previously explained, a precise alignment of the pattern of images on the sensitized printing plates 12 with the plates themselves is not always required, due to the provision of means on the conventional presses for effecting a cocking adjustment of the printing plates, the full utilization of the printing plates makes it desirable to align the plates relative to the rest of the apparatus so that the image patterns will occupy the same relative position or "fit" on the plates. Accordingly, means 91, which will provide indicia for aligning the printing plates, is mounted on the register means 16 of Figure 1 and the register means 83 of Figures 6 and 7. The means 91 may be in any suitable form which will provide rectangularly related edges with which the edges of the printing plates 12 may be coincided. As here shown, the means 91 consists of a pair of thin rods or wands 92 and 93 secured to the frame of the register device and extending therefrom in parallel relation to the two sets of perpendicularly related parallel lines forming the indicia 56.

While the two forms of the apparatus of the present invention are illustrated as having horizontal tables, the apparatus is equally effective with photo-composing machines having vertically disposed table surfaces. In such machines, the reciprocating means 42, carrier member 43, and the negative holders 13 and register device 54 supported thereby, will all be rotated 90°, thus maintaining the same relationship to the table top 19 as in the apparatus shown. If desired, a plurality of parallel tables 19 may be provided, each table top having a separate register and holder apparatus associated therewith. In such case, the registers and holders may be ganged, that is connected by suitable elements, for simultaneous operation.

From the foregoing description it will be seen that the image registering apparatus for photo-composing machines of the present invention will afford a rapid and precise means of orienting halftone negatives so as to accomplish precise registration of the images therefrom. Any danger of losing the orientation during shifting from one machine to the other or danger of damaging the equipment during such shifting as is encountered in existing devices is done away with by eliminating the need for such shifting, the entire operation being carried out on a compact, foolproof and relatively inexpensive apparatus.

What is claimed is:

1. An apparatus for aligning index marked halftone negatives relative to sensitized printing plates comprising, table means adapted to receive and support said sensitized plates, a negative holder formed to receive and support said halftone negatives, means for moving said negative holder between a first station in juxtaposition to said table means with said negative in contact with said sensitized plate for printing thereon and a second station spaced from said table means, and register means movable into a predetermined relation to said negative holder when the latter is at said second station and being adapted for aligning the index marks on said halftone negatives whereby successive negatives may be precisely oriented relative to said table means, said register means being formed to provide indicia for orienting said sensitized plates relative to said table means.

2. An apparatus for aligning index marked halftone negatives relative to sensitized printing plates comprising, table means adapted to receive and support said sensitized plates, a carrier member mounted adjacent to said table means, a negative holder supported on said carrier member and formed to receive and support said halftone negatives, means for moving said negative holder between a first station in juxtaposition to said table means with said negative in contact with said sensitized plate for printing thereon and a second station spaced from said table means, and register means supported on said carrier member for movement into a predetermined relation to said negative holder when the latter is in said second station and being adapted for aligning the index marks on said halftone negatives whereby successive negatives may be precisely oriented relative to said table means, said register means being formed to provide indicia for orienting said sensitized plates relative to said table means.

3. An apparatus for aligning index marked halftone negatives relative to sensitized printing plates comprising, table means adapted to receive and support said sensitized plates, an elongated carrier member mounted adjacent to said table means, a negative holder slidably mounted on said carrier member and formed to receive and support said halftone negatives, means for moving said carrier member toward and away from said table means between a first station with said negative holder in juxtaposition to said table means with said negative in contact with said sensitized plate for printing thereon and a second station with said negative holder spaced from said table means, register means supported on said carrier member and adapted for movement into a predetermined relation to said negative holder when the latter is in said second station and being adapted when in said relation for aligning the index marks on said halftone negatives whereby successive negatives may be precisely oriented relative to said table means, said register means being formed to provide indicia for orienting said sensitized plates relative to said table means.

4. An apparatus for aligning index marked halftone negatives relative to sensitized printing plates comprising, table means adapted to receive and support said sensitized plates, an elongated carrier member supported adjacent to said table means, a negative holder slidably mounted on said carrier member and formed to receive and support said halftone negatives, means for moving said carrier member toward and away from said table means between a first station with said negative holder in juxtaposition to said table means with said negative in contact with said sensitized plate for printing thereon and a second station with said negative holder spaced from said table means, a register device slidably supported on said carrier member, means connecting said register device and carrier member and adapted for moving said register device into a predetermined relation to said negative holder when the latter is in said second station, said register device being adapted for aligning the index marks on said halftone negatives whereby successive negatives may be precisely oriented relative to said table means, said register device being formed to provide indicia for orienting said sensitized plates relative to said table means.

5. An apparatus for aligning index marked halftone negatives relative to sensitized printing plates comprising, table means adapted to receive and support said sensitized plates, a negative holder formed to receive and support said halftone negatives, means for moving said negative holder betwen a first station in juxtaposition to said table means with said negative in contact with said sensitized plate for printing thereon and a second station spaced from said table means, a register device movable into a predetermined relation to said negative holder when the latter is at said second station and having a frame supporting a transparent plate provided with indicia cooperative with the index marks on said negatives for aligning the latter relative to said table means, and means for orienting said sensitized plates on said table means.

6. An apparatus as characterized in claim 5 and having a light source on said frame adapted to pass light through said transparent plate for illuminating said indicia.

7. An apparatus for aligning index marked halftone negatives relative to sensitized plates in a photo-composing machine comprising, table means adapted to receive and support said sensitized plates, an elongated carrier member supported adjacent to said table means, a negative holder slidably mounted on said carrier member and having a transparent plate adapted to support a halftone negative marked with a plurality of cross-marks for indexing, adjustment means on said negative holder for effecting rotation of said transparent plate, means for moving said negative holder between a first station in juxtaposition to said table means for printing said negative on said sensitized plates and a second station spaced from said table means, and register means supported on said carrier member for movement into a predetermined relation to said negative holder when the latter is in said second station, said register means having indicia providing perpendicularly related lines with which said cross-marks on said negatives may be aligned by operation of said adjustment means whereby successive negatives may be precisely oriented relative to said table means, and an indicator mounted on said register means for movement therewith and formed with an edge with which the edge of said sensitized plates may be aligned so as to precisely orient said plates relative to said table means.

8. An apparatus for aligning index marked halftone negatives with sensitized plates mounted on a movable table of a simultaneous step and repeat photo-composing machine comprising, a negative holder formed to receive and support said halftone negatives, means for moving said negative holder between a first station in juxtaposition to said table with said negative in contact with said sensitized plates for printing thereon and a second station spaced from said table means, and register means movable into a predetermined relation to said sensitized plates and to said negative holder when the latter is at said second station, said register means having indicia adapted for aligning the index marks on said negatives whereby successive negatives may be precisely oriented relative to said sensitized plates to insure complete registry of images on successive plates.

9. An apparatus for aligning index marked halftone negatives relative to sensitized printing plates comprising, a step and repeat photo-composing machine table adapted to receive and support a plurality of sensitized plates each of which is adapted for imprinting with a series of images representing different colors, a plurality of negative holders formed to receive and support the halftone negatives for different colors, and register means movable into a predetermined relation to each of said negative holders and having visible indicia for aligning the index marks on said halftone negatives for orienting said negatives in precise relation to each other.

10. An apparatus as characterized in claim 9 and having an indicator mounted on said register means for movement therewith and formed with an edge with which the corresponding edges of said sensitized plates may be aligned so as to precisely orient said plates relative to said table.

11. An apparatus for aligning index marked halftone negatives relative to sensitized printing plates comprising, a step and repeat photo-composing machine table movable in perpendicular directions in the plane of the table and being adapted to receive and support a plurality of spaced sensitized plates each of which is adapted for imprinting with a series of images representing different colors, a carrier member mounted adjacent to said table, a plurality of negative holders mounted on said carrier member and formed to receive and support the halftone negatives for different colors in spaced relation corresponding to the spacing of said sensitized plates, and register means mounted on said carrier member for movement into a predetermined relation to each of said negative holders and being adapted for aligning the index marks on said halftone negatives for orienting said negatives in precise relation to each other.

12. An apparatus for aligning index marked halftone negatives relative to sensitized printing plates comprising, a step and repeat photo-composing machine table movable in perpendicular directions in the plane of the table and being adapted to receive and support a plurality of spaced sensitized plates each of which is adapted for imprinting with a series of images representing different colors, an elongated carrier member mounted adjacent to said table, a plurality of negative holders formed to receive and support halftone negatives for different colors and being formed for sliding movement along said carrier member for positioning said holders in spaced relation corresponding to the spacing of said sensitized plates, and register means slidably mounted on said carrier member for movement therealong and into successive predetermined relation with each of said negative holders, said register means being formed for aligning the index marks on said halftone negatives relative to said register means when in said predetermined relation and consequently to orient said negatives in precise relation to each other.

13. An apparatus as characterized in claim 12 wherein means is provided connected to said carrier member for moving the latter toward and away from the plane of said table so as to move said negative holders away from said sensitized plates during said sliding movement of said register device into said successive predetermined relation to said negative holders.

14. An apparatus for aligning index marked halftone negatives with spaced sensitized plates mounted on a movable table of a simultaneous step and repeat photo-composing machine comprising, a carrier member supported adjacent to said table, a plurality of negative holders mounted in predetermined spaced relation on said carrier member so as to individually overlie said sensitized plates, a register device adapted for alignment with said plates and supported on said carrier member for sliding movement therealong between said negative holders and having indicia for aligning the index marks of said halftone negatives relative to each other, and reciprocating means connected to said carrier member for selectively positioning said negative holders at first and second stations in juxtaposition to and spaced from said sensitized plates respectively, said register device being proportioned to pass between said plates and said negative holders when the latter are at said second stations.

15. An apparatus as characterized in claim 14 wherein means is provided on said register device for selectively moving the latter toward and away from said negative holders whereby said register device may be spaced from said negative holders during its sliding movement and moved into contact with said negative holders during said aligning.

16. An apparatus as characterized in claim 14 wherein said register device includes a frame supporting a transparent plate formed with perpendicularly related lines providing said indicia for aligning the index marks on said halftone negatives.

17. An apparatus for aligning index marked halftone negatives with spaced sensitized plates mounted on a movable table of a simultaneous step and repeat photo-composing machine comprising, an elongated carrier member supported adjacent to said table, a plurality of negative holders slidably mounted on said carrier member for movement into individually overlying relation to said sensitized plates with each of said holders having a transparent plate adapted to support a halftone negative provided with a plurality of indexing cross-marks, adjustment means on said negative holders for effecting rotative movement of said transparent plates for orienting the negatives supported in each holder relative to the other negatives, a register device adapted for alignment with said plates and supported on said carrier member for sliding movement therealong between said negative holders and into a predetermined relation to each of said negative holders, said register device being formed with indicia providing perpendicularly related lines with which said cross-marks on said negatives may be aligned by operation of said adjustment means to rotate said transparent plate whereby said negatives may be precisely oriented relative to each other, and reciprocating means connected to said carrier member for selectively positioning said negative holders at first and second stations in juxtaposition to and spaced from said sensitized plates respectively, said register device being proportioned to pass between said plates and said negative holders when the latter are at said second stations.

18. An apparatus for aligning index marked halftone negatives with spaced sensitized plates mounted on a movable table of a simultaneous step and repeat photo-composing machine comprising, an elongated carrier member supported adjacent to said table and having extensions projecting perpendicularly therefrom in overlying relation to said table, a plurality of negative holders mounted in predetermined spaced relation on said extensions so as to individually overlie said sensitized plates, register means supported on said carrier member for sliding movement therealong and having a register device movable perpendicularly to said carrier member and being formed with indicia for aligning the index marks of said halftone negatives relative to each other, and reciprocating means connected to said carrier member for selectively positioning said negative holders at first and second stations in juxtaposition to and spaced from said sensitized plates respectively, said register means being proportioned to pass between said plates and said negative holders when the latter are at said second stations.

19. An apparatus as characterized in claim 18 wherein each of said negative holders has a transparent plate adapted to support a halftone negative, and adjusting means for effecting rotative movement of said transparent plate for orienting the negatives supported thereon in precise relation to the negatives supported by the other of said negative holders.

20. An apparatus for aligning index marked halftone negatives with spaced sensitized plates mounted on the movable table of a simultaneous step and repeat photo-composing machine comprising, a photo-composing table movable in mutually perpendicular directions parallel to the plane of the table, an elongated carrier member supported adjacent to said table, a plurality of extension arms slidably supported on said carrier member for movement therealong and being formed to project perpendicularly therefrom in overlying relation to said table, a plurality of negative holders mounted for sliding movement along said extension arms for individual positioning into overlying relation to sensitized plates supported on said table, register means supported on said carrier member for sliding movement therealong and having a register device movable perpendicularly to said carrier member and parallel to said extension arms whereby said register device may be positioned in predetermined relation to each of said negative holders in successive order, said register device being formed with indicia for aligning the index marks of said halftone negatives relative to each other.

References Cited in the file of this patent

UNITED STATES PATENTS

| | | |
|---|---|---|
| 1,199,597 | Ogden | Sept. 26, 1916 |
| 2,290,585 | Gentry | July 21, 1942 |
| 2,492,528 | Huebner | Dec. 27, 1949 |
| 2,512,937 | Hartman | June 27, 1950 |
| 2,711,031 | Kessler | June 21, 1955 |